(12) United States Patent
Canuto (10) Patent No.: US 9,863,456 B2
(45) Date of Patent: Jan. 9, 2018

(54) DEVICE FOR COMPENSATING OFFSET IN AUTOMATIC LOCKING SYSTEMS

(71) Applicant: Almerino Canuto, Casale sul Sile (IT)

(72) Inventor: Almerino Canuto, Casale sul Sile (IT)

( * ) Notice: Subject to any disclaimer, the term of this patent is extended or adjusted under 35 U.S.C. 154(b) by 417 days.

(21) Appl. No.: 14/407,201

(22) PCT Filed: Jul. 2, 2013

(86) PCT No.: PCT/EP2013/063898
§ 371 (c)(1),
(2) Date: Dec. 11, 2014

(87) PCT Pub. No.: WO2014/009201
PCT Pub. Date: Jan. 16, 2014

(65) Prior Publication Data
US 2015/0167719 A1    Jun. 18, 2015

(30) Foreign Application Priority Data

Jul. 11, 2012 (IT) .............................. TV2012A0129

(51) Int. Cl.
*F16B 21/07* (2006.01)
*B23Q 1/00* (2006.01)
(Continued)

(52) U.S. Cl.
CPC ........ *F16B 21/073* (2013.01); *B23B 31/1071* (2013.01); *B23Q 1/0072* (2013.01);
(Continued)

(58) Field of Classification Search
CPC ... B23B 31/30; B23B 31/107; B23B 31/1071; B23Q 1/00; B23Q 1/0072; B23Q 1/0081; B23Q 3/08; B23Q 3/18; B23Q 3/183
See application file for complete search history.

(56) References Cited

U.S. PATENT DOCUMENTS 4,636,135 A * 1/1987 Bancon ................ B25J 15/0491
29/26 A
5,415,384 A * 5/1995 Obrist .................. B23Q 1/0072
269/309
(Continued)

FOREIGN PATENT DOCUMENTS

EP    0803316 A1   10/1997
EP    0976481 A2   2/2000
(Continued)

OTHER PUBLICATIONS

International Search Report for corresponding application PCT/EP2013/063898 filed Jul. 2, 2013; dated Oct. 8, 2013.
(Continued)

*Primary Examiner* — Daniel Wiley
(74) *Attorney, Agent, or Firm* — Cantor Colburn LLP (57) ABSTRACT

A device for compensating the offset in automatic locking systems for the mounting of blanks comprising a box-like body composed of a T-shaped hollow body and a U-shaped base, which form an inner seat for a frustum-shaped jacket, which is arranged coaxially to the shank of the hollow body and above a piston, which can move transversely to the shank, a traction element being slideably arrangeable in the shank of the hollow body, the traction element cooperating selectively with balls which can be accommodated within openings provided in the shank and within second seats provided on the jacket, elastically compressible elements being arranged between the head of the hollow body and the jacket.

12 Claims, 7 Drawing Sheets

(51) Int. Cl.
*B23B 31/107* (2006.01)
*B23Q 3/18* (2006.01)

(52) U.S. Cl.
CPC ........ *B23Q 3/183* (2013.01); *B23B 2260/026* (2013.01); *B23B 2265/12* (2013.01); *Y10T 403/604* (2015.01)

(56) References Cited

U.S. PATENT DOCUMENTS

| | | | | |
|---|---|---|---|---|
| 5,810,344 A * | 9/1998 | Nishimoto | ......... | B23B 31/1071 269/309 |
| 5,918,870 A * | 7/1999 | Stark | ................... | B23B 31/1071 269/309 |
| 5,961,261 A * | 10/1999 | Stark | ................... | B23Q 1/0063 269/309 |
| 6,073,325 A * | 6/2000 | Stark | ................... | B23Q 1/0072 198/345.3 |
| 6,145,824 A * | 11/2000 | Stark | ................... | B23Q 1/0018 269/20 |
| 6,170,836 B1 * | 1/2001 | Etter | ................... | B23Q 1/0072 269/26 |
| 6,273,434 B1 * | 8/2001 | Stark | ................... | B23B 31/1071 269/309 |
| 6,283,465 B1 * | 9/2001 | Etter | ................... | B23B 31/1071 269/309 |
| 6,485,214 B2 * | 11/2002 | Schill | ................... | B23B 29/046 269/309 |
| 6,527,266 B1 * | 3/2003 | Yonezawa | ........... | B23Q 1/0081 269/309 |
| 6,530,568 B2 * | 3/2003 | Etter | ....................... | B23B 31/22 269/309 |
| 6,532,861 B2 * | 3/2003 | Etter | ................... | B23Q 1/0072 269/309 |
| 6,641,128 B2 * | 11/2003 | Fries | ................... | B23Q 1/0072 269/309 |
| 6,799,758 B2 * | 10/2004 | Fries | ................... | B23Q 1/0072 269/309 |
| 6,860,477 B2 * | 3/2005 | Etter | ................... | B23Q 1/0072 269/309 |
| 6,997,448 B2 * | 2/2006 | Roth | ................... | B23Q 1/0072 269/309 |
| 7,219,886 B2 * | 5/2007 | Etter | ................... | B23Q 1/0072 269/309 |
| 7,382,145 B2 * | 6/2008 | Thurmaier | ......... | G01R 31/2887 269/309 |
| 7,425,000 B2 * | 9/2008 | Stark | ................... | B23B 37/00 269/309 |
| 7,520,495 B2 * | 4/2009 | Stark | ................... | B23Q 1/0072 269/309 |
| 7,654,285 B2 * | 2/2010 | Stark | ................... | B23Q 1/0018 137/614.03 |
| 7,748,690 B2 * | 7/2010 | Stark | ................... | B23B 31/1071 269/309 |
| 8,005,570 B2 * | 8/2011 | Gloden | ............... | B23B 31/1071 403/31 |
| 8,585,031 B2 * | 11/2013 | Stark | ................... | B23Q 1/0072 269/309 |
| 9,302,359 B2 * | 4/2016 | Hediger | ................... | B23Q 3/06 |
| 9,527,139 B2 * | 12/2016 | Mellstrom | ............... | B23B 31/24 |
| 2007/0158891 A1 * | 7/2007 | Stark | ................... | B23Q 11/08 269/309 |
| 2012/0169002 A1 * | 7/2012 | Canuto | ................... | B23Q 3/103 269/296 |
| 2015/0190895 A1 * | 7/2015 | Canuto | ................... | B23Q 3/103 269/296 |
| 2015/0246421 A1 * | 9/2015 | Canuto | ................ | B23Q 1/0081 279/144 |

FOREIGN PATENT DOCUMENTS

| | | |
|---|---|---|
| EP | 1346794 A1 | 9/2003 |
| EP | 1743733 A1 | 1/2007 |
| WO | 2005075145 A1 | 8/2005 |

OTHER PUBLICATIONS

Written Opinion for corresponding application PCT/EP2013/063898 filed Jul. 2, 2013; dated Oct. 8, 2013.

* cited by examiner

DEVICE FOR COMPENSATING OFFSET IN AUTOMATIC LOCKING SYSTEMS

The present application relates to a device for compensating offset in automatic locking systems for the mounting of blanks.

Nowadays European patent EP1346794B1 is known which relates to a modular structure, particularly for mounting blanks on retainers, which addresses the problem that arises when certain operations need to be carried out, such as for example painting, cleaning and assembly, or the execution of various different forms of working, such as for example removing shavings, which require the locking of the piece and/or blank in a preset position for the treatment thereof.

Thus devices are known which are indispensable whenever the stable locking is required of an object to be treated by way of generic and even simple operations, not necessarily in a purely industrial setting.

A significant drawback, which is complained of in conventional devices, lies in the fact that in order to achieve a stable locking of the piece it is necessary to bring both of the spacing elements of the locking device in contact with two opposite side faces of the same piece.

In this manner the possibility is thus ruled out of executing any working at those side faces, which, since they are affected by the contact, have no free surfaces to allow contact with the tool or, more generally, with the component of any machine tool.

The necessity follows from this of having to subsequently remove the piece, positioning it according to a new orientation which is such as to allow the exposure of the two side surfaces which were before partially concealed by the locking elements.

A further aggravating factor of the above problem consists in that, during the locking of the piece, the latter has at least three surfaces on which no working can be done, the third surface, in addition to the side surfaces adjacent to the locking elements, being the lower one, which entirely rests on the work surface of the machine tool.

The necessity follows from this of having to resort to multiple successive positionings and associated lockings of the piece, with the further aggravating factor of possibly repeatedly making systematic positioning errors, which thus have a negative effect on the overall precision that can be achieved at the end of working on the piece.

Another problem that is complained of in conventional devices lies in the necessity to avail of qualified labor in order to be able to perform the delicate preliminary operations of positioning and centering the piece.

An additional drawback, which often recurs in conventional locking devices, consists in the possibility of damaging the piece by local deformation, at the surfaces that have already been worked and are subsequently subjected to contact with the brackets, in order to allow the working of surfaces of the piece which have not yet been treated.

A significant problem, in addition to those mentioned above, relates to the considerable expenditure of time caused by repeated, successive operations for unlocking, repositioning and relocking a piece that is intended to receive some form of treatment on a plurality of surfaces.

In a partial solution to such drawbacks, the EP1346794B1 patent claims a modular structure, for mounting, on retainers, blanks having at least one seat, said modular structure comprising at least one flat plate that has a plurality of first seats for detachable connection of first fixing means for at least one first body and second temporary fixing means allowing detachable connection of said first body to said blank characterized in that said second temporary fixing means allow connection of said modular structure at said seat formed in said blank and in that it further comprises a first centering bush for the automatic centering of said first body with respect to said first seat, said first bush having a first portion which is connectable in said first seat and a second frustum-shaped upper portion which has an approximately frustum-shaped outer perimetric surface that protrudes above the plate once the connection between the first seat and the bush has been achieved, said second frustum-shaped upper portion having a lower surface directly in contact with an upper surface of said flat plate; said first means for fixing said first body to said plate comprise a first traction element for connection between said first seat and said first body and a first vise-like device, which is associated with said first body, so as to temporarily lock said first traction element; said first body, which is cylindrical, has a second axial hole for the partial containment of said first and/or second traction elements, and comprises, in a lower region, a third through hole that is formed radially and is meant to accommodate said first vise-like device, said third hole affecting said second axial hole approximately at right angles; said first vise-like device is constituted by a pair of first jaws, which can be accommodated inside said third hole and are arranged mirror-symmetrically in mutually diametrically opposite positions, and said first jaws, which are substantially cylindrical, are mutually associable by way of activation means, which are constituted by a first screw, which is arranged coaxially to a fourth hole and a fifth hole which are through holes and are formed axially along said pair of first jaws.

This solution, although solving the above-mentioned problems, also has drawbacks in that it has been found that in the parts to be fixed, and thus in the blanks (designated with 50 in the EP1346794B1 patent), a first threaded hole (designated with 36 in the EP patent) is obtained for a fixing element (such as a threaded shank, designated with 39a in the EP patent) and thus a first seat (designated with 34 in the EP patent) for a centering bush (designated with 37 in the EP patent): in the course of the production process of the part to be fixed, some working steps can cause the geometric shape of the piece to vary, since the first seat may subsequently be recentered with a greater size and in the best adapted position for the centering of the part (slightly shifted from the previous one).

It follows from this that the diameters of the first hole and of the first seat do not have the same axis.

The aim of the present invention is therefore to resolve the above-mentioned technical problems, eliminating the drawbacks in the cited known art, by providing a device that makes it possible to offset the centering position from the fixing position.

Within this aim, an object of the invention is to make it possible to position and stably lock the pieces on the platform of any machine tool, so as to perform the desired workings.

Another object is to provide a device that makes it possible to simultaneously work on the highest possible number of surfaces of the piece, by working on at least five distinct axes that are perpendicular to each other, and to ensure an optimal precision of centering of the blank, thus furthermore making it possible to repeat the centering in the event of subsequent operations performed at another time.

Another object is to provide a device that enables use that is quite safe and easy even by people with no special training and that involves a substantially flexible use, the invention being easily adaptable even to pieces of appreciably different weights, dimensions and shapes.

Another object is to provide a device that makes it possible to quickly perform the preliminary operations of locking the piece, in order to reduce production costs.

Another object is to provide a device that, in addition to the above characteristics, is also low-cost and can be provided with usual and conventional machinery and plants.

This aim and these and other objects which will become more apparent hereinafter are achieved by a device for compensating offset in automatic locking systems for the mounting of blanks provided with a first hole, for a fixing element, at the end of which there is a first seat for a centering bush, characterized in that it is constituted by a box-like body composed of a T-shaped hollow body and a U-shaped base, which form an inner seat for a frustum-shaped jacket, which is arranged coaxially to the shank of said hollow body and above a piston, which can move transversely to said shank, a traction element being slideably arrangeable in said shank of said hollow body and being axially integral with said fixing element, said centering bush being associated in an upper region and coaxially therewith and being arrangeable at said first seat, which has a larger diameter than said first fixing hole and is provided eccentrically to the latter, said traction element cooperating selectively with balls which can be accommodated within adapted openings provided in said shank and within adapted second seats provided on said jacket, elastically compressible elements being arranged between the head of said hollow body and said jacket, means being provided to allow a temporary axial movement of said piston.

Further characteristics and advantages of the invention will become more apparent from the detailed description of a particular, but not exclusive, embodiment, illustrated by way of non-limiting example in the accompanying drawings wherein.

In the embodiments illustrated, individual characteristics shown in relation to specific examples may in reality be interchanged with other, different characteristics, existing in other embodiments.

Moreover, it should be noted that anything found to be already known during the patenting process is understood not to be claimed and to be the subject of a disclaimer.

With reference to the figures, the reference numeral 1 designates a device for compensating the offset in automatic locking systems for the mounting of blanks 2 which have a first, threaded hole 3 for a fixing element 4 that is constituted by a complementarily threaded shank.

At the end of the first hole 3 there is, affecting the surface 5 of the blank 2, a first seat 6 for a centering bush 7.

Figure 4:
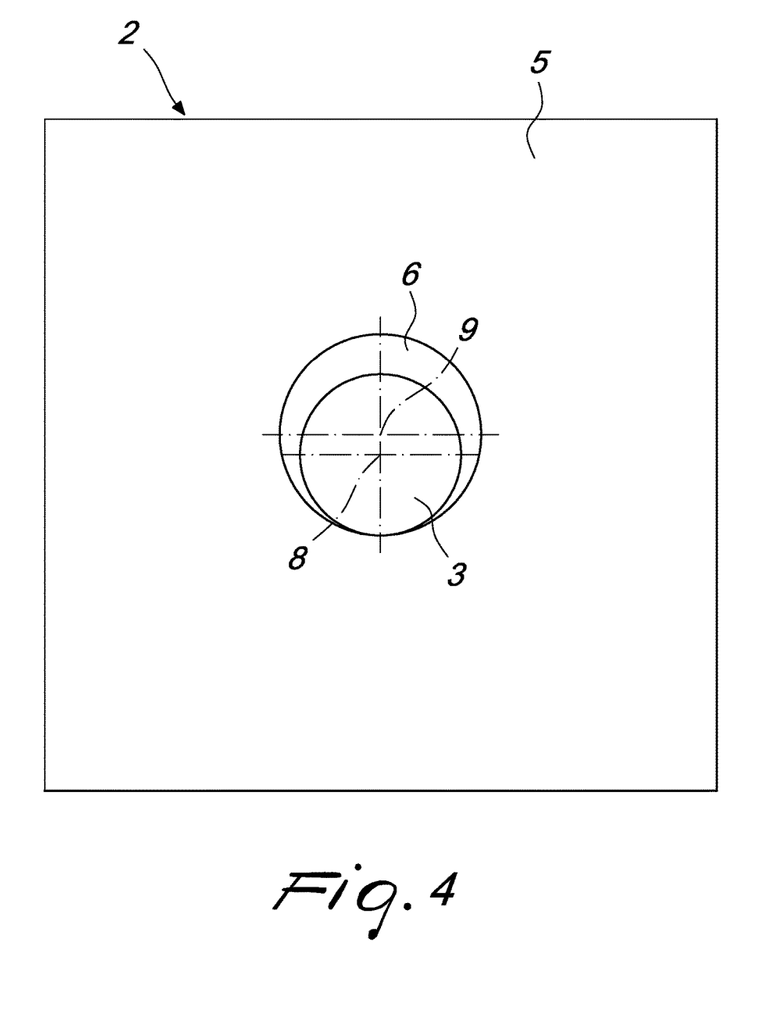
FIG. 4 is a plan view of the first hole and the first seat.
Figure 5:
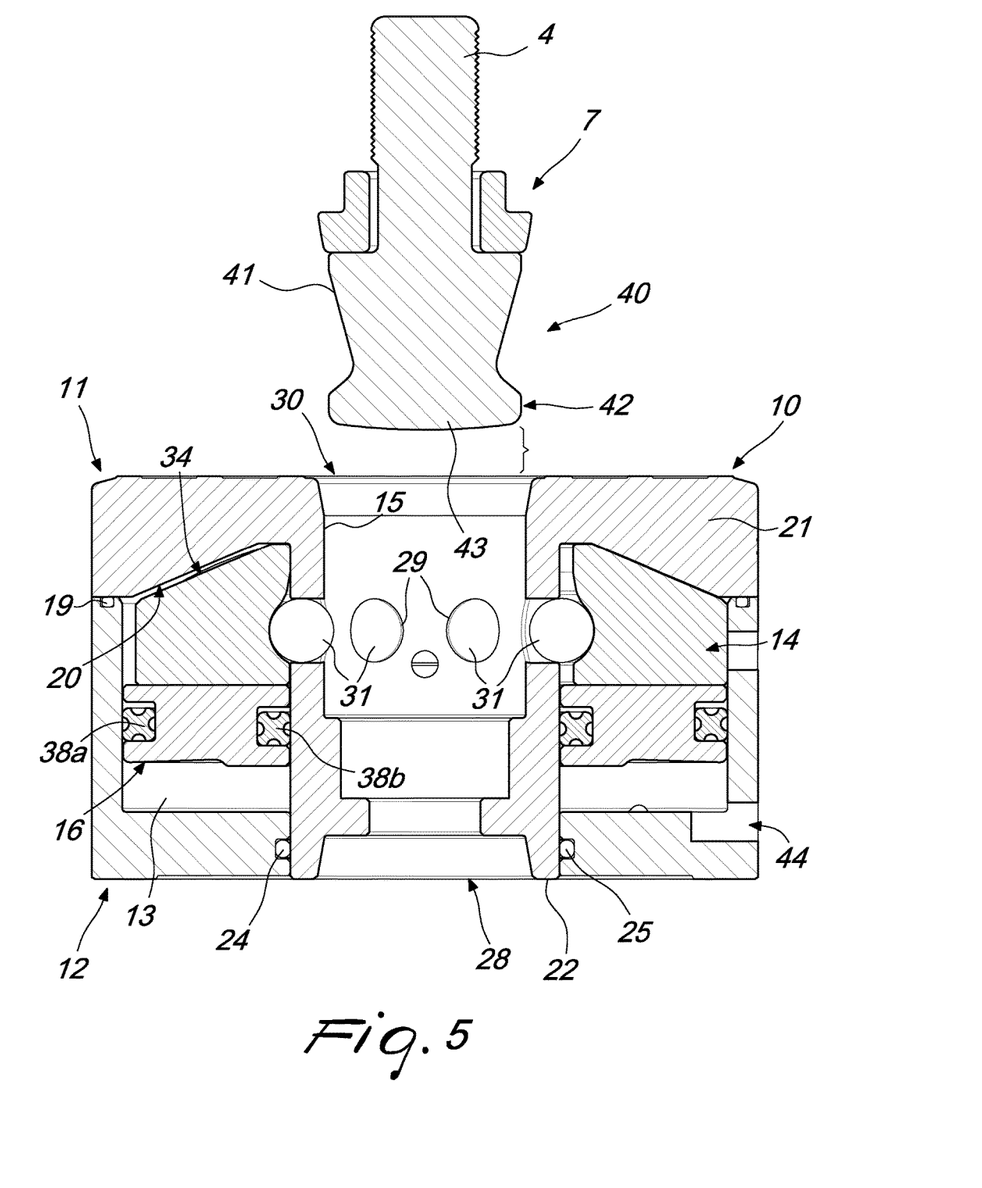
FIGS. 5, 6 and 7 are views showing the interaction of various components.

The first hole 3 has a first axis 8 which is offset with respect to a second axis 9 of the first seat 6.

The first seat 6 has a larger diameter than said first hole and is thus eccentric with respect to the first hole 3.

Figure 1:
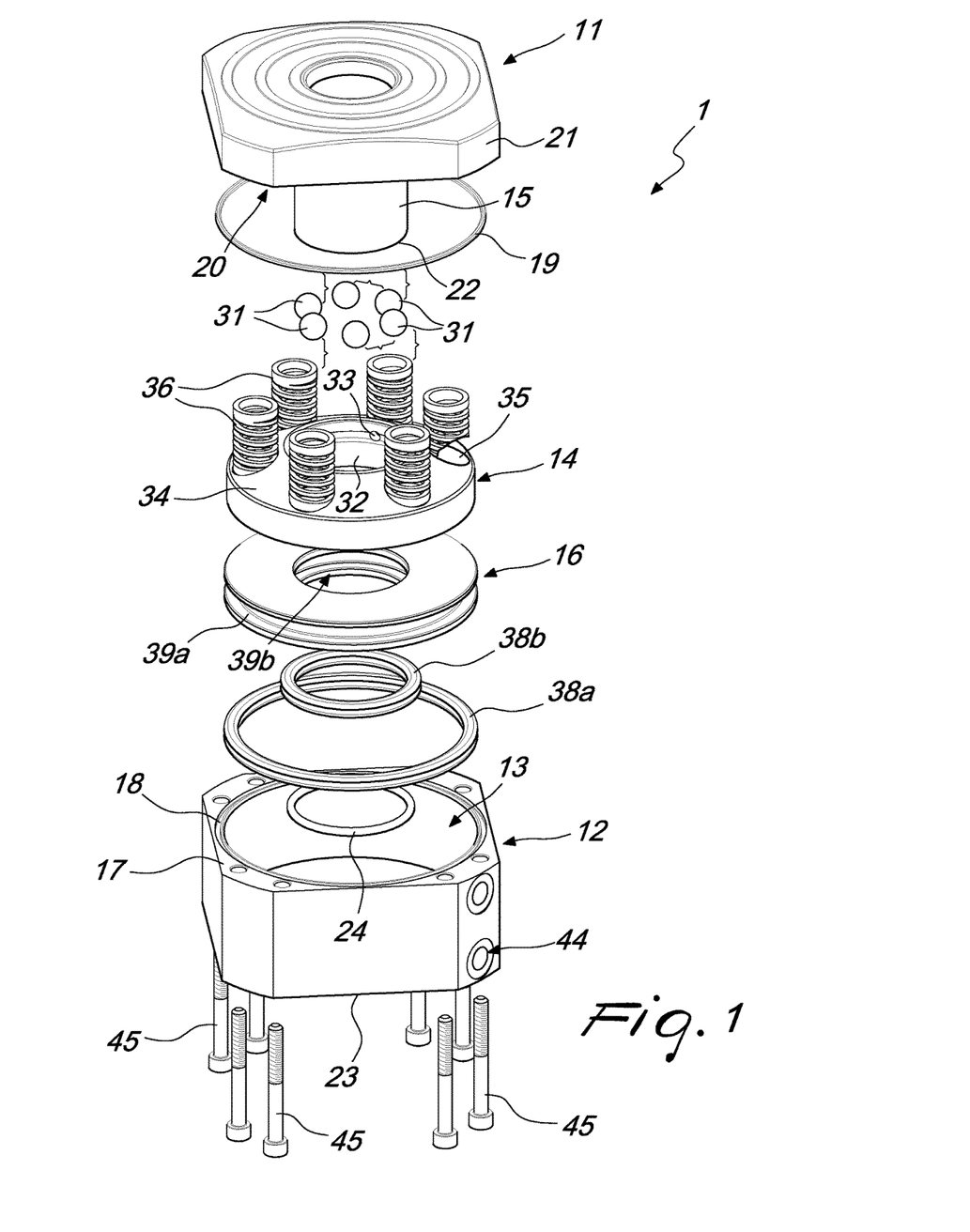
FIG. 1 is a three-quarters exploded side view of the invention.
Figure 2:
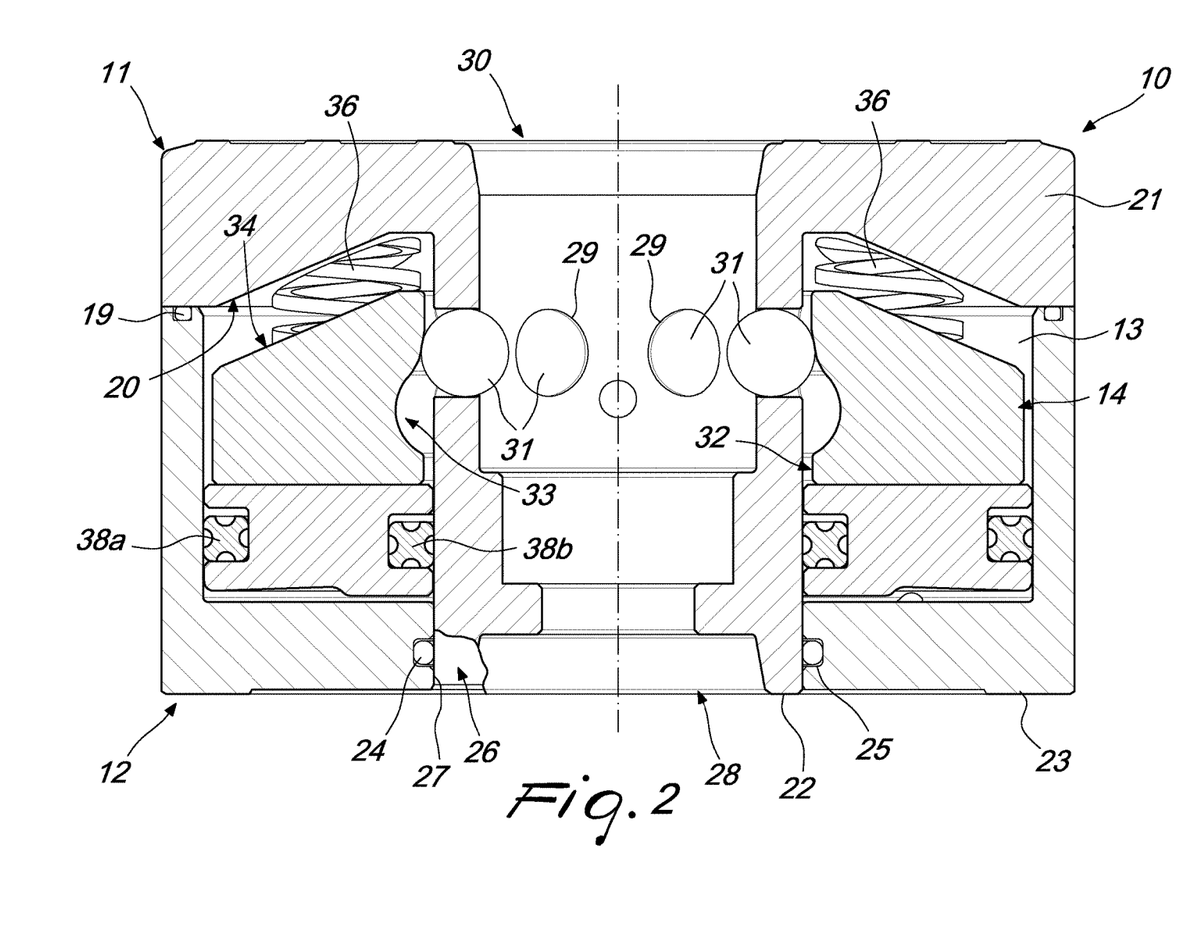
FIG. 2 is a sectional view, along a sectional plane transverse to the box-like body, of some components of the invention.

The device 1 is constituted by a box-like body 10 composed of a T-shaped hollow body 11 and a U-shaped base 12,
which form an inner seat 13 for a frustum-shaped jacket 14, which is arranged coaxially to the shank 15 of the hollow body 11 and above a piston 16 with the capability of moving transversely to the shank 15.

In the upper surface 17 of the base 12 there is a first annular groove 18 which acts as a seat for a first gasket 19 that is adapted to provide a seal at the lower perimetric edge 20 of the head 21 of the hollow body 11. The length of the shank 15 is such that its lower end 22 is positioned substantially at the plane of arrangement of the lower surface 23 of the base 12.

Thus the base 12 has, in its lower surface 23, a second hole 26 within which the lower end 22 of the shank 15 of the hollow body 11 operates. A second gasket 24 is also present which can be arranged in a second annular groove 25 that is formed in the first wall 27 of the hollow body 11, which is formed by the second hole 26.

Proximate to the lower end 22 of the hollow body 11, there is a third seat 28 for an optional further centering bush, not shown, which can be associated with an adapted plate.

In the shank 15 of the hollow body 11 there are adapted openings 29 which are substantially circular in plan view and are arranged on a same plane which is transverse to the shank 15.

Such openings 29 are provided in proximity to the open upper end 30 of the hollow body 11.

Adapted balls 31 are selectively arrangeable inside the openings 29 and do not have the possibility of falling into the shank 15.

Figure 3:
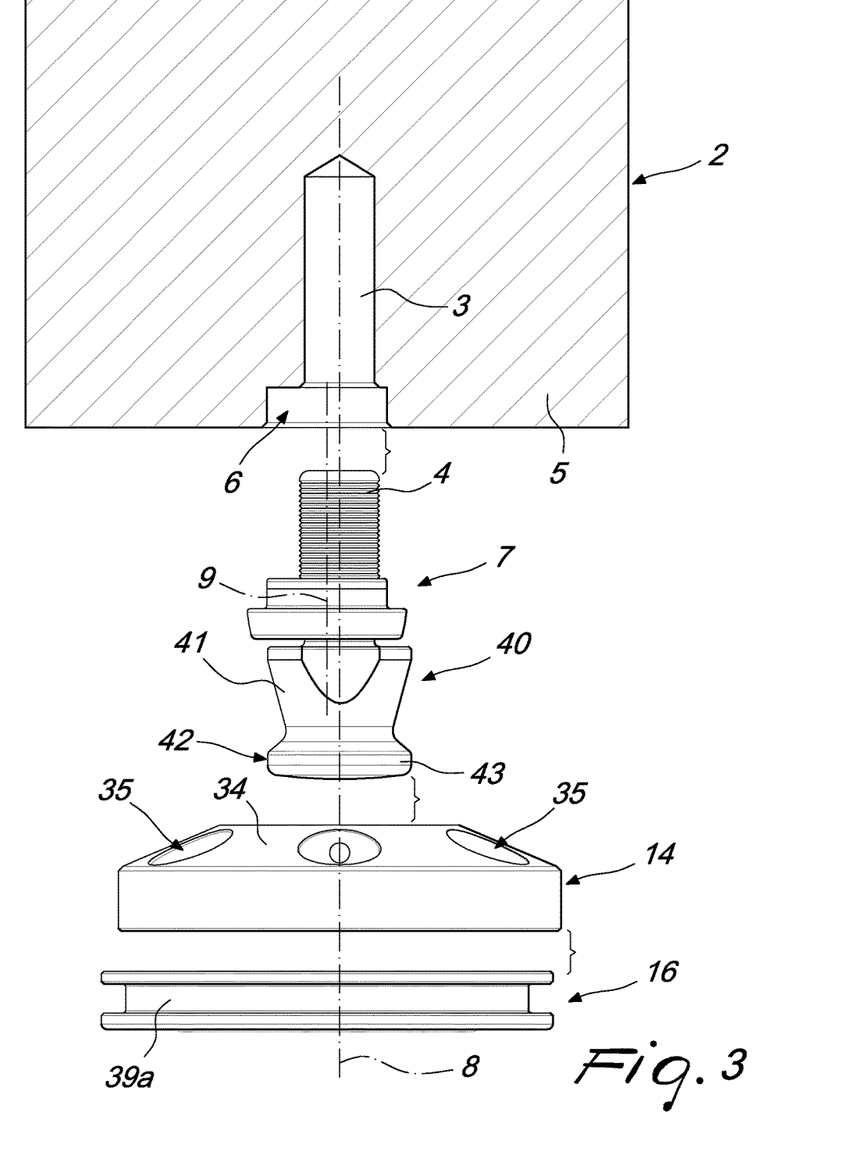
FIG. 3 is a partially sectional exploded view of the blank, the fixing element with the bush and the traction element, the jacket and the piston.

The frustum-shaped jacket 14 is axially perforated in order to permit the passage of the shank 15 of the hollow body 11, the jacket being provided with a second wall 32, facing the shank 15, on which second seats 33 are provided.

Such balls 21 can be selectively accommodated within the second seats 33 when the second seats are arranged on the same plane in which the openings 29 are formed in the shank 15 of the hollow body 11.

Between the head 21 of the hollow body 11 and the upper surface 34 of the jacket 14 there are fourth seats 35 for elastically compressible elements 36 such as cylindrical compression springs.

The jacket 14 is of such size as to be capable of being subjected to a transverse movement inside the inner seat 13 of the box-like body 10; the jacket 14 is thus able to perform a movement with respect to the shank 15 in the sense that its second wall 32 can move toward or away from the shank 15.

The piston 16 is essentially constituted by a pulley-shaped element which is arranged in the space between the shank 15 of the hollow body 11 and the inner side surface 37 of the base 12.

The seal is made possible by the presence of a pair of third gaskets 38a and 38b which are provided in complementarily shaped third annular grooves 39a and 39b.

The pair of third gaskets forms means that are adapted to enable a temporary axial movement of said piston.

At the shank 15 of the hollow body 11 and inside it is possible to slideably arrange a traction element 40, which is axially integral, in a downward region, with the fixing element 4 and with which the centering bush 7 is associated in an upper region and coaxially therewith.

Figure 7:
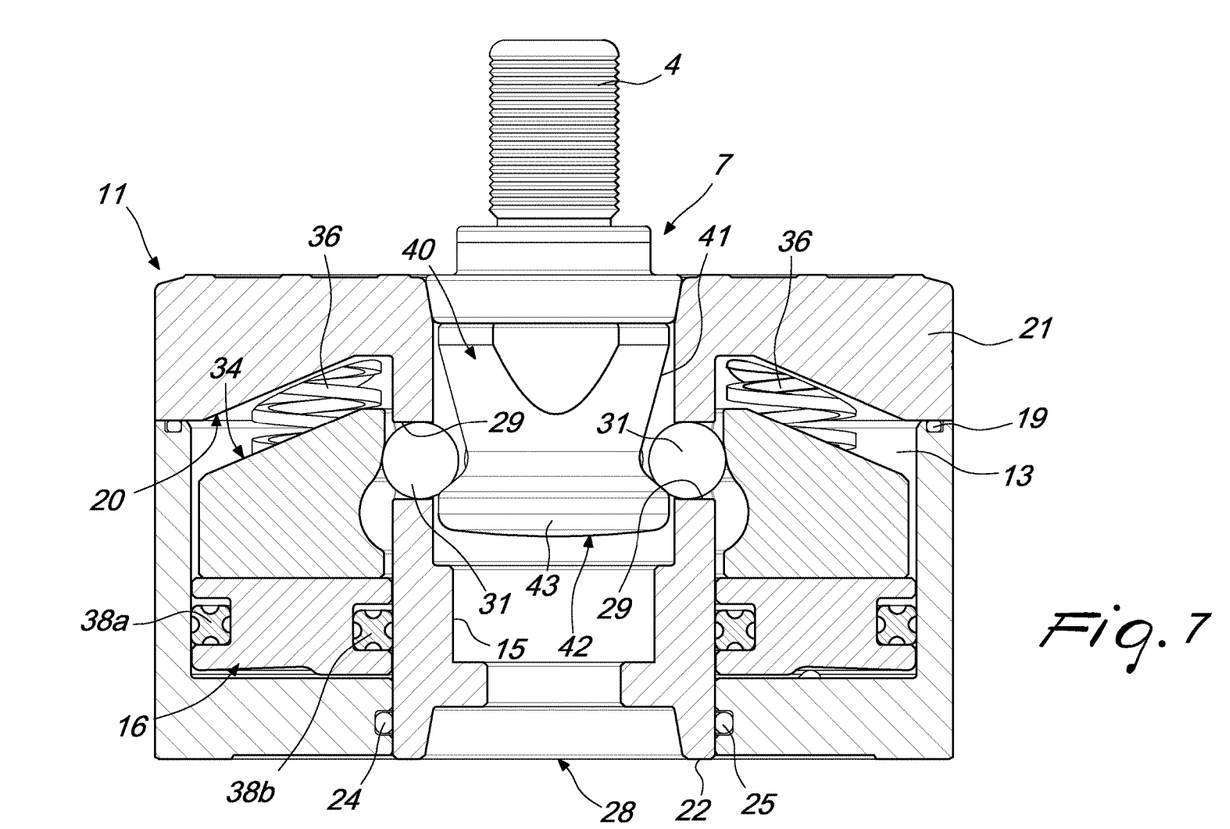

The traction element 40 has a conical body 41 the end tip 42 of which, which is directed away from the fixing element 4, has an expansion 43. In the connecting region between the conical body 41 and the expansion 43, as shown in FIG. 7, the balls 31 are selectively arranged, and their function in this position is to place the traction element 40 under tension.

Adapted screws 45 are provided which are adapted to mutually fasten and fix the base 12 and the hollow body 11.

Figure 6:
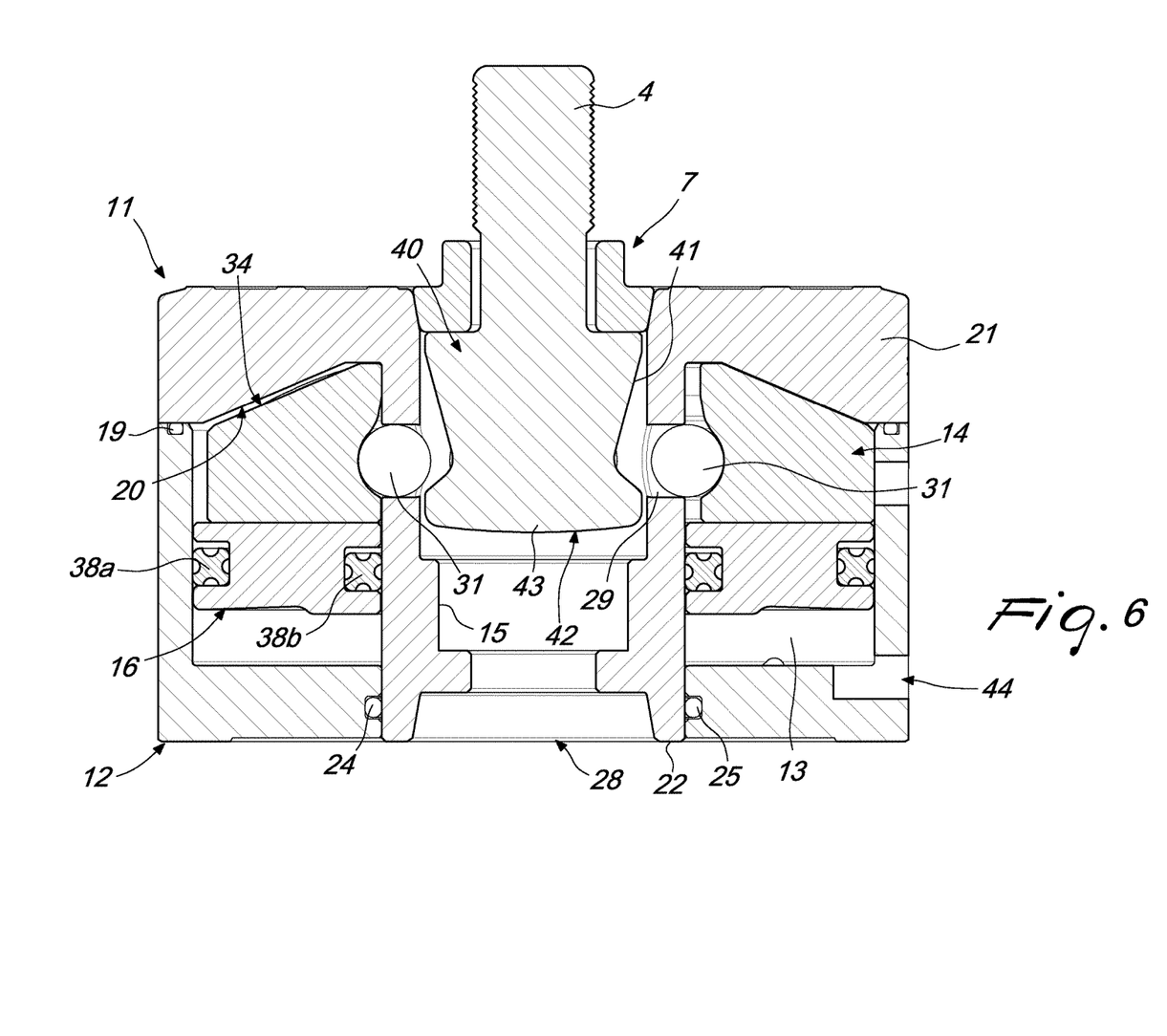

During operation of the device, initially it is filled, at an adapted channel 44 that is provided in proximity to the lower surface 23 of the base 12, with air under pressure which affects the part of the inner seat 13 of the box-like body 10 underlying the piston 16, as shown in FIG. 6.

The air lifts the piston 16 and as a consequence also the jacket 14, thus compressing the elastically compressible elements 36.

In this manner the balls 31 are free to move inside the openings 29 and thus also toward the second seats 33.

At this point the traction element 40 is inserted into the box-like body 10 through the open upper end 30 of the hollow body 11 until the end tip 42 and thus the expansion 43 are positioned at or slightly below the openings 29 which are provided in the shank 15, as shown in FIG. 6.

When the air pressure is released, the elastically compressible elements 36 push the jacket 14 and the piston 16 downward: in this manner the balls 31 are pushed by the jacket 14 so as to exit from the second seats 33 and thus exit slightly from the second openings 29 so as to affect the connecting region between the conical body 41 and the end tip 42 of the traction element 40, as shown in FIG. 7.

In this manner the traction element 40 is placed in downward traction.

Since the jacket 14 can move horizontally, it follows that the offset of the traction element 40 with respect to the centering bush 7 can be accepted, such offset being due to the offset of the first axis 8 and of the second axis 9 respectively of the first hole 3 for the fixing element 4 and of the first seat 6 for the centering bush 7.

The possibility offered to the jacket 14 of moving in the inner seat 13 and thus with respect to the shank 15 of the hollow body 11 makes it possible to accept such misalignment, by compensating it.

In practice it has been found that the invention has fully achieved the intended aim and objects, a device being obtained that makes it possible to offset the centering position from the fixing position, thus making it possible to position and stably lock the pieces on the platform of any machine tool, so as to perform the desired workings.

Naturally the materials used as well as the dimensions of the individual components of the invention may be more pertinent to specific requirements.

The various means of achieving certain different functions certainly need not coexist only in the embodiment shown, but may be present in many embodiments, even if they are not shown.

The characteristics indicated above as advantageous, convenient or the like, may also be missing or be substituted by equivalent characteristics.

The disclosures in Italian Patent Application No. TV2012A000129 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A device for compensating the offset in automatic locking systems for the mounting of blanks provided with a first hole at the end of which there is a first seat, said device comprising:
 a fixing element,
 a centering bush,
 a box-like body composed of a T-shaped hollow body and a U-shaped base, which form an inner seat,
 a frustum-shaped jacket, which is arranged in said inner seat and coaxially to a shank of said hollow body,
 a piston, which is arranged below said frustum-shaped jacket and can move transversely to said shank,
 a traction element which is slideably arrangeable in said shank of said hollow body and is axially integral with said fixing element,
 wherein said centering bush is associated in an upper region of said traction element and coaxially with said traction element,
 wherein said traction element is arranged to cooperate selectively with balls which can be accommodated within openings provided in said shank and within second seats provided on said frustum-shaped jacket,
 wherein the device further comprises elastically compressible elements being arranged between a head of said hollow body and said frustum-shaped jacket.

2. The device according to claim 1, further comprising a blank provided with a first hole, for said fixing element, at the end of which there is a first seat for said centering bush,
 wherein said first hole is threaded and has a first axis which is offset from a second axis of said first seat, said first seat having a larger diameter than said first hole and being therefore eccentric with respect to said first hole.

3. The device according to claim 2, wherein said elastically compressible elements are adapted to press said frustum-shaped jacket and said piston downward so that said balls are pushed by said frustum-shaped jacket so as to exit from said second seats and thus exit slightly from said openings so as to affect a connecting region between a conical body and an end tip of said traction element, which is thus subjected to downward traction, said frustum-shaped jacket being allowed to move horizontally so as to accept the offset of said traction element with respect to said centering bush, said offset being caused by the offset of said first axis and of said second axis, respectively of said first hole for said fixing element and of said first seat for said centering bush, said frustum-shaped jacket being allowed to move in said inner seat with respect to said shank.

4. The device according to claim 1, wherein the length of said shank is such as to arrange its lower end substantially at the plane of arrangement of the lower surface of said base, which has, in a lower surface, a second hole, in which said lower end of said shank of said hollow body operates, said device further comprising a second gasket, which can be arranged in a second annular groove provided in a first wall of said base formed by said second hole in proximity to the lower end of said hollow body there being a third seat for an optional additional centering bush, which can be associated with an adapted plate.

5. The device according to claim 4, wherein said piston is arranged in a space between said shank of said hollow body and an inner lateral surface of said base, a seal being made possible by the presence of a pair of third gaskets provided in complementarily shaped third annular grooves.

6. The device according to claim 4, wherein it has at least one channel, which is provided in proximity to the lower surface of said base, for the injection and extraction of air under pressure, which affects a part of said inner seat of said box-like body that lies below said piston, said air lifting said piston and consequently also said frustum-shaped jacket, compressing said elastically compressible elements so as to allow said balls to move within said openings and thus also toward said second seats.

7. The device according to claim 1, wherein said openings, which are provided in said shank of said hollow body, have a substantially circular plan shape and are arranged on a same plane which is transverse to said shank, said openings being provided in proximity to an open upper end of said hollow body, said balls being arrangeable selectively within said openings without the possibility of falling into said shank.

8. The device according to claim 7, wherein said frustum-shaped jacket is perforated axially in order to allow the passage of said shank of said hollow body, said frustum-shaped jacket having a second wall, which faces said shank, on which there are said second seats, where said balls can be selectively accommodated within said second seats if said second seats are arranged on the same plane in which said openings formed in said shank of said hollow body are provided.

9. The device according to claim 8, wherein said frustum-shaped jacket has such dimensions that it can be subjected to a transverse motion within said inner seat of said box-like body, said frustum-shaped jacket being able to perform a movement with respect to said shank so that said second wall can move toward or away from said shank.

10. The device according to claim 7, wherein said traction element has a conical body, an end tip of which, directed away from said fixing element, has an expansion, said balls being selectively arranged in a region of connection between said conical body and said expansion and having, in this position, the function of subjecting said traction element to traction, wherein once said traction element has been inserted in said box-like body through the open upper end of said hollow body until the end tip and therefore the expansion are located at or slightly below said openings provided in said shank, by releasing the air pressure said elastically compressible elements press downward said frustum-shaped jacket, which can move within said inner seat and therefore with respect to said shank of said hollow body.

11. The device according to claim 1, wherein fourth seats are provided, between the head of said hollow body and an upper surface of said frustum-shaped jacket, for said elastically compressible elements.

12. The device according to claim 1, wherein said traction element is axially integral with a lower region of said fixing element, said traction element having a conical body, an end tip of which, directed away from said fixing element, has an expansion, said balls being selectively arranged in a region of connection between said conical body and said expansion and having, in this position, the function of subjecting said traction element to traction.

\* \* \* \* \*